3,404,184
DIMETHOXYHEXANITROBIPHENYL AND
PROCESS FOR PRODUCING SAME AND
DIAMINOHEXANITROBIPHENYL
Robert E. Oesterling, Adelphi, Md., Joseph C. Dacons, Washington, D.C., and Lloyd A. Kaplan, Silver Spring, Md., assignors to the United States of America as represented by the Secretary of the Navy
No Drawing. Filed May 28, 1964, Ser. No. 371,139
16 Claims. (Cl. 260—581)

The invention described herein may be manufactured and used by or for the Government of the United States of America for governmental purposes without the payment of any royalties thereon or therefor.

This invention relates to the preparation of a thermally stable explosive compound and a novel intermediate therefor. Specifically, the invention is directed to an improved method of preparing 3,3'-diamino-2,2',4,4',6,6'-hexanitrobiphenyl (DIPAM) via 3,3'-dimethoxy-2,2',4,4'-6,6'-hexanitrobiphenyl.

In copending application Ser. No. 334,667, filed Dec. 30, 1963, and commonly assigned, there is disclosed, for the first time, the preparation and characterization of DIPAM. It was therein found that the addition of amino groups to the hexanitrobiphenyl molecule adds sufficient energy to the crystal lattice to raise the melting point of the resulting compound to the point where a thermally stable explosive is obtained. Thus, DIPAM was prepared by oxidizing dimethyl hexanitrophenyl to dipicric acid, a very difficult oxidation, converting the dipicric acid to its dipyridinium salt, converting the salt to dipicryl chloride and converting the dipicryl chloride to DIPAM. Although the method set forth therein is satisfactory in many respects, the multiplicity of procedures involved is rather time consuming and tends to reduce the maximum overall yield obtainable. Moreover, although the process gave good results on a laboratory scale, difficulties were encountered in larger scale syntheses.

Accordingly, it has now been found that DIPAM may be prepared by a novel method which combines simplicity and ease of operation with high overall yield and relatively low cost.

General procedure

The novel synthesis of the invention comprises the nitration of an m-haloanisole to the 3-halo-2,4,6-trinitro derivative, the novel coupling of two molecules of the trinitro derivative by condensation and the subsequent amination of the novel condensation product to obtain DIPAM.

The general reaction sequence is presented diagrammatically as follows:

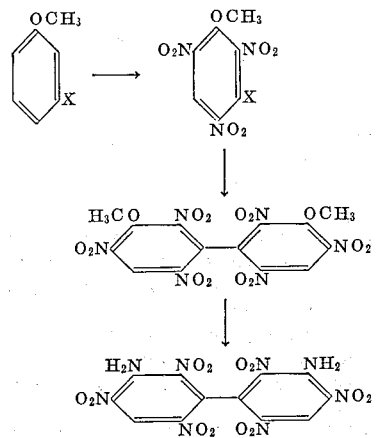

In the above-outlined reaction sequence X is bromine, chlorine or iodine. The first step is the conversion of m-haloanisole to the corresponding 3-halo-2,4,6-trinitroanisole by addition of the starting material to a mixture of nitric acid and oleum, although it is to be understood that other nitration procedures known to be equivalent to those skilled in the art may be substituted for the instant procedure.

The m-haloanisole starting material is commercially available and may be prepared by the diazotization of m-anisidine, for example, by reacting m-anisidine with $Cu_2Br_2$—HBr in nitrous acid (Sandmeyer reaction) or by the methylation of an m-halophenol by reaction thereof with, for example, dimethyl sulfate. Preferred m-haloanisoles within the scope of the invention are m-chloroanisole, m-bromoanisole and m-iodoanisole.

It has been found that the 3-halo-2,4,6-trinitroanisole thus prepared must be of a high degree of purity in order to obtain about 92% purity or the damp, water-washed, Small quantities of water, acids or phenols may cause extensive side reactions at this stage. The crude product is therefore either recrystallized from carbon tetrachloride to obtain about 92% purity or the damp, water-washed, crude nitration product may be dissolved in acetone and reprecipitated by drowning in a large volume of water to obtain a product having an adequate degree of purity.

The next step is the preparation of the novel intermediate 3,3' - dimethoxy-2,2',4,4',6,6'-hexanitrobiphenyl by the coupling of two molecules of 3-halo-2,4,6-trinitroanisole. Accordingly, a solution of, for example, 3-bromo-2,4,6-trinitroanisole in a slurry of copper powder in a diluent such as nitrobenzene is heated to a temperature of from about 100° C. to about 150° C. In lieu of nitrobenzene as diluent, there may be used benzene, chlorobenzene, toluene or xylene and other similar materials. The reaction is preferably run at the refluxing temperature of the diluent.

It is essential that the crude product be of such quality that only one crystallization will be required prior to the subsequent amination step. Since the purity of the crude DIPAM depends upon the purity of the dimethoxyhexanitrobiphenyl, prior to amination, it is essential that the dimethoxy hexanitrobiphenyl be of good quality. It has been found that in the conversion of 3-halo-2,4,6-trinitroanisole to the dimethoxy hexanitrobiphenyl, some cleavage of methoxyl groups occurs. As a result, small amounts of 3-hydroxy-3'-methoxy-2,2',4,4',6,6'-hexanitrobiphenyl and 3,3' - dihydroxy-2,2',4,4',6,6'-hexanitrobiphenyl apparently are present in the reaction mixture. If these are not removed prior to amination, the resulting DIPAM will be contaminated with the corresponding mono- and diammonium salts.

Accordingly, two procedures may be followed in preparation for the amination step. The first procedure involves isolation and purification of the dimethoxy hexanitrobiphenyl, followed by amination in a suitable diluent. The second procedure involves removal of impurities from the reaction solution followed by amination in situ.

The final step is amination of the dimethoxy hexanitrobiphenyl which is accomplished by bubbling dry, gaseous ammonia into an alcohol solution of dimethoxy hexanitrobiphenyl. Alternately, one may aminate in tetrahydrofuran-alcohol, toluene-tetrahydrofuran-alcohol or xylene-tetrahydrofuran-alcohol. It is to be noted that each solvent in the latter two diluent systems plays a unique role in the amination process. Thus, the alcohol increases the capacity of the solutions for ammonia and the tetrahydrofuran increases the capacity of the solutions for dimethoxy hexanitrobiphenyl and DIPAM, thus tending to keep the reactions homogeneous. The toluene and xylene, in which DIPAM is insoluble, tend to enhance the complete recovery of the product as the solutions are concentrated following amination.

The manner of carrying out the process of this invention will be further apparent from the following illustrative examples, it being understood that the scope of the invention is not to be limited thereby.

EXAMPLE 1

This example illustrates the preparation of 3-bromo-2,4,6-trinitroanisole by the reaction of 3-bromoanisole with nitric acid and oleum.

To 360 g. of 90% nitric acid in a 2-liter round-bottom flask there was slowly added 450 ml. of 30% oleum with external cooling to keep the temperature at about 50° C. The mixture was cooled to 30–35 degrees C. and 187 g. of 3-bromoanisole was slowly added over a period of one hour with stirring. The temperature was held at about 35° C. or below and stirring was continued for one hour after completion of the reaction. The reaction mixture was then drowned in ice water and stirred and then allowed to coagulate for approximately one hour. The granular solid was filtered and washed with water until the filtrate was essentially neutral. After filtration, the granular, yellow 3-bromo-2,4,6-trinitroanisole was found to be sufficiently pure for the subsequent condensation reaction. The yield of product was 288 g. (90%).

EXAMPLE 2

This example illustrates the preparation of 3,3'-dimethoxy-2,2',4,4',6,6'-hexanitrobiphenyl by the reaction of 3-bromo-2,4,6-trinitroanisole with a slurry of copper powder in toluene.

A slurry of 37.8 g. (0.6 mole) of copper powder in 150 m. of dry toluene in a 2-liter flask was heated to mild reflux in an oil bath. A solution of 96.6 g. (0.3 mole) of dry 3-bromo-2,4,6-trinitroanisole was made in 165 ml. of toluene and was added to the refluxing copper slurry. Initially, about 25 ml. of the anisole solution was added in one portion and when the copper had begun to lose its luster (about 2–3 minutes) the remainder of the anisole solution was added over a ten-minute period. Heating and stirring was continued for five minutes after addition was complete. The hot reaction mixture was then filtered and the inorganic residue was washed on the funnel with 250 ml. of hot toluene in several portions. A volume of 200 ml. of tetrahydrofuran was added to the filtrate and washings, the solution was treated with 25 g. of Darco G-60, filtered, and the charcoal was washed with 250 ml. of hot toluene. The filtrate and the washings were combined and the mixture was filtered with suction while hot and the solids washed thoroughly with acetone. The combined filtrates and washings were then steam distilled to remove the toluene. The residue was then dissolved in acetone, treated with Darco charcoal and evaporated to a volume of about 50 ml. Water was then added to the hot concentrate till the cloud point and the solution was cooled to 0° C. At this point a yellow solid separated which was further purified by reprecipitation from acetone and filtration. There was obtained 60.0 g. (83% of theoretical) of 3,3'-dimethoxy-2,2',4,4',6,6'-hexanitrobiphenyl in the form of pale yellow crystal having a M.P. of 194–95° C.

Analysis.—Calculated: C, 34.71; H, 1.65; N, 17.4. Found: C, 34.92; H, 2.98; N, 17.9. Calculated for $C_{14}H_8N_6O_{14}$.

EXAMPLE 3

This example illustrates the preparation of 3,3'-diamino-2,2',4,4',6,6'-hexanitrobiphenyl, by amination of the product of Example 2.

The 3,3'-dimethoxy-2,2',4,4',6,6'-hexanitrobiphenyl of Example 2 was dissolved in 250 ml. of tetrahydrofuran and divided into two equal fractions for amination.

To one of the equal fractions was added 200 ml. of absolute methanol and the solution was saturated with anhydrous ammonia, without cooling. The solution was boiled on the steam bath, with slow stirring, to remove excess ammonia. Soon after boiling started, a yellow precipitate began to form. When extensive precipitation had occurred, 150 ml. of toluene was added and boiling was continued until the vapors were only slightly alkaline. The mixture was then cooled to 10° C., filtered, washed thoroughly with cold methanol and dried at 110° C. The bright yellow DIPAM weighed 23.0 g. (82% of theoretical).

The second equal fraction was evaporated on the steam bath to a volume of about 50 ml. The product was precipitated by adding several volumes of n-hexane while heating and stirring. The suspension was then cooled to room temperature and the supernatant liquor was removed by decantation. A volume of 400 ml. of absolute methanol was added and anhydrous ammonia was bubbled into the slurry at a rapid rate for fifteen minutes. The mixture was then boiled on a steam bath in a 1-liter beaker while stirring slowly until the vapors were only slightly alkaline and massive crystallization had occurred. Upon cooling to 10° C., filtering and washing with cold methanol, the product was dried in an oven at 110° C. The yield of bright yellow DIPAM was 26.5 g. (94% of theoretical).

EXAMPLE 4

This example illustrates the preparation of 3-chloro-2,4,6-trinitroanisole by the nitration of 3-chloroanisole.

A mixture of 360 g. 90% nitric acid and 450 ml. of 30% oleum in a 2-liter flask was cooled to 20° C. A solution of 43 g. (1.0 mole) of 3-chloroanisole in 100 ml. of methylene chloride was added slowly, at 20–25° C., over a period of one hour. The mixture was then stirred for one hour after addition was complete, poured into 3 liters of ice and water and vigorously stirred. The product was recovered by filtration and washed by water until the filtrate was neutral. Upon air drying, the yield was 267 g. (96% of theoretical) of crude 3-chloro-2,4,6-trinitroanisole. Recrystallization from carbon tetrachloride gave the pure product as pale yellow crystals.

EXAMPLE 5

This example illustrates the preparation of 3,3'-dimethoxy-2,2',4,4',6,6'-hexanitrobiphenyl by the reaction of 3-chloro-2,4,6-trinitroanisole with a slurry of copper powder in xylene.

A slurry of 40 g. (0.6 mole) of copper powder, 105.4 g. (0.2 mole) of 3-chloro-2,4,6-trinitroanisole and 350 ml. of dry xylene was prepared in a 1-liter flask. The slurry was heated to mild reflux on an oil bath. After about five minutes, the copper began to lose its luster which indicated that the reaction was proceeding. A solution of 105.4 g. (0.2 mole) of 3-chloro-2,4,6-trinitroanisole was then added over a period of about five minutes. Reflux was continued for approximately 10 minutes after the addition was complete. There was then added 40 g. of Darco G-60 and the mixture was heated with vigorous stirring for an additional five minutes, filtered while hot and the residue was washed with 400 ml. of hot xylene.

EXAMPLE 6

This example illustrates the preparation of DIPAM from the product obtained in Example 5.

To the product obtained from Example 5, there was added 300 ml. of tetrahydrofuran and 600 ml. of absolute methanol. The solution was then saturated with an anhydrous ammonia and evaporated on the steam bath, while stirring slowly, until massive precipitation had occurred and the vapors were slightly alkaline. The slurry was then cooled to 10° C., filtered and washed thoroughly with cold methanol. On drying in the oven at 110° C. the bright yellow DIPAM weighed 64 g. (71% of theoretical).

It is to be noted that, for purposes of clarity in illustrating the reaction sequence, the above examples disclose isolation and purification of 3,3'-dimethoxy-2,2',4,4',6,6'-hexanitrobiphenyl with subsequent amination in a suitable diluent. In the preferred manner of producing DIPAM, however, impurities are removed from the reaction solution and amination is accomplished in situ.

Specifically, the conversion of the 3-halo-2,4,6-trinitroanisole to DIPAM is preferably carried out without the isolation of intermediates. For example, to the purified product solution of Example 2 there is preferably added a diluent or diluent system, as in Example 3, and dry, gaseous ammonia is then bubbled into the mixture to obtain DIPAM. Similarly, the procedures illustrated by Examples 5 and 6, are preferably combined to produce DIPAM from 3-chloro-2,4,6-trinitroanisole without isolation of the dimethoxy intermediate.

Obviously, many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States of America is:

1. The compound 3,3'-dimethoxy-2,2',4,4',6,6'-hexanitrobiphenyl.

2. The method of preparing 3,3'-diamino-2,2',4,4',6,6'-hexanitrobiphenyl which comprises:
 (a) nitrating a m-haloanisole to obtain 3-halo-2,4,6-trinitroanisole, said halo substituent being selected from the group consisting of chlorine, bromine and iodine;
 (b) condensing two molecules of said 3-halo-2,4,6-trinitroanisole by reaction thereof with a slurry comprising copper powder and a diluent to obtain 3,3'-dimethoxy-2,2',4,4',6,6'-hexanitrobiphenyl; and
 (c) aminating said 3,3'-dimethoxy-2,2',4,4',6,6'-hexanitrobiphenyl to obtain 3,3'-diamino-2,2',4,4',6,6'-hexanitrobiphenyl.

3. The method of claim 2 wherein said diluent is selected from the group consisting of benzene, nitrobenzene, chlorobenzene, toluene and xylene.

4. The method of claim 2 wherein said 3,3'-dimethoxy-2,2',4,4',6,6'-hexanitrobiphenyl is purified prior to amination.

5. The method of claim 2 wherein said amination is accomplished by introducing ammonia into a solution comprising 3,3' - dimethoxy - 2,2',4,4',6,6' - hexanitrobiphenyl.

6. The method of claim 5 wherein said solution comprises 3,3'-dimethoxy-2,2',4,4',6,6'-hexanitrobiphenyl and a diluent selected from methanol, tetrahydrofuran, methanol - tetrahydrofuran, toluene-methanol-tetrahydrofuran and xylene-methanol-tetrahydrofuran.

7. The method of claim 2 wherein said 3,3'-dimethoxy-2,2',4,4',6,6'-hexanitrobiphenyl is purified and isolated prior to amination.

8. The method of claim 2 wherein said 3,3'-dimethoxy-2,2',4,4',6,6'-hexanitrobiphenyl is purified, a diluent is added thereto and amination is accomplished in situ.

9. The method of claim 2 wherein said condensation is carried out at the reflux temperature of the diluent.

10. The method of claim 6 wherein said amination is carried out at the reflux temperature of the diluent.

11. The method of preparing the compound of claim 1 which comprises condensing two molecules of a 3-halo-2,4,6-trinitroanisole by reaction thereof with a slurry of copper powder and a diluent, said halo substituent being selected from the group consisting of chlorine, bromine, and iodine.

12. The method of claim 11 wherein the diluent is selected from the group consisting of benzene, nitrobenzene, chlorobenzene, toluene and xylene.

13. The method of preparing 3,3'-diamino-2,2',4,4',6,6'-hexanitrobiphenyl which comprises:
 (a) nitrating a m-haloanisole with a mixture of nitric acid and oleum to obtain 3-halo-2,4,6-trinitroanisole, said halo substituent being selected from the group consisting of chlorine, bromine, and iodine;
 (b) condensing two molecules of said 3-halo-2,4,6-trinitroanisole by reaction thereof with a slurry of copper powder and a diluent to obtain 3,3'-dimethoxy-2,2',4,4',6,6'-hexanitrobiphenyl, said diluent being selected from the group consisting of benzene, nitrobenzene, chlorobenzene, toluene and xylene; and
 (c) aminating said 3,3'-dimethoxy-2,2',4,4',6,6'-hexanitrobiphenyl to 3,3'-diamino-2,2',4,4',6,6'-hexanitrobiphenyl by introducing ammonia into a solution comprising said 3,3'-dimethoxy-2,2',4,4',6,6'-hexanitrobiphenyl and a diluent selected from the group consisting of methanol, tetrahydrofuran, methanol-tetrahydrofuran, toluene-methanol-tetrahydrofuran, and xylene-methanol-tetrahydrofuran.

14. A method for preparing 3,3'-diamino-2,2',4,4',6,6'-hexanitrobiphenyl comprising:
 (a) condensing two molecules of a 3-halo-2,4,6-trinitroanisole by reaction thereof with a slurry of copper powder and a diluent, said halo substituent being selected from the group consisting of chlorine, bromine, and iodine and
 (b) aminating the 3,3'-dimethoxy-2,2',4,4',6,6'-hexanitrobiphenyl formed by the condensation to 3,3'-diamino-2,2',4,4',6,6'-hexanitrobiphenyl.

15. The method of claim 14 wherein said amination is accomplished by introducing ammonia into a solution comprising 3,3' - dimethoxy - 2,2',4,4',6,6' - hexanitrobiphenyl.

16. The method of claim 15 wherein said solution comprises 3,3'-dimethoxy-2,2',4,4',6,6'-hexanitrobiphenyl and a diluent selected from methanol, tetrahydrofuran, methanol-tetrahydrofuran, toluene-methanol-tetrahydrofuran and xylene-methanol-tetrahydrofuran.

References Cited

De la Mere et al.: Aromatic Substitution Nitration and Halogenation, Academic Press, Inc., New York, 1959, p. 101.

CHARLES B. PARKER, *Primary Examiner.*

P. C. IVES, *Assistant Examiner.*